Figure 1:
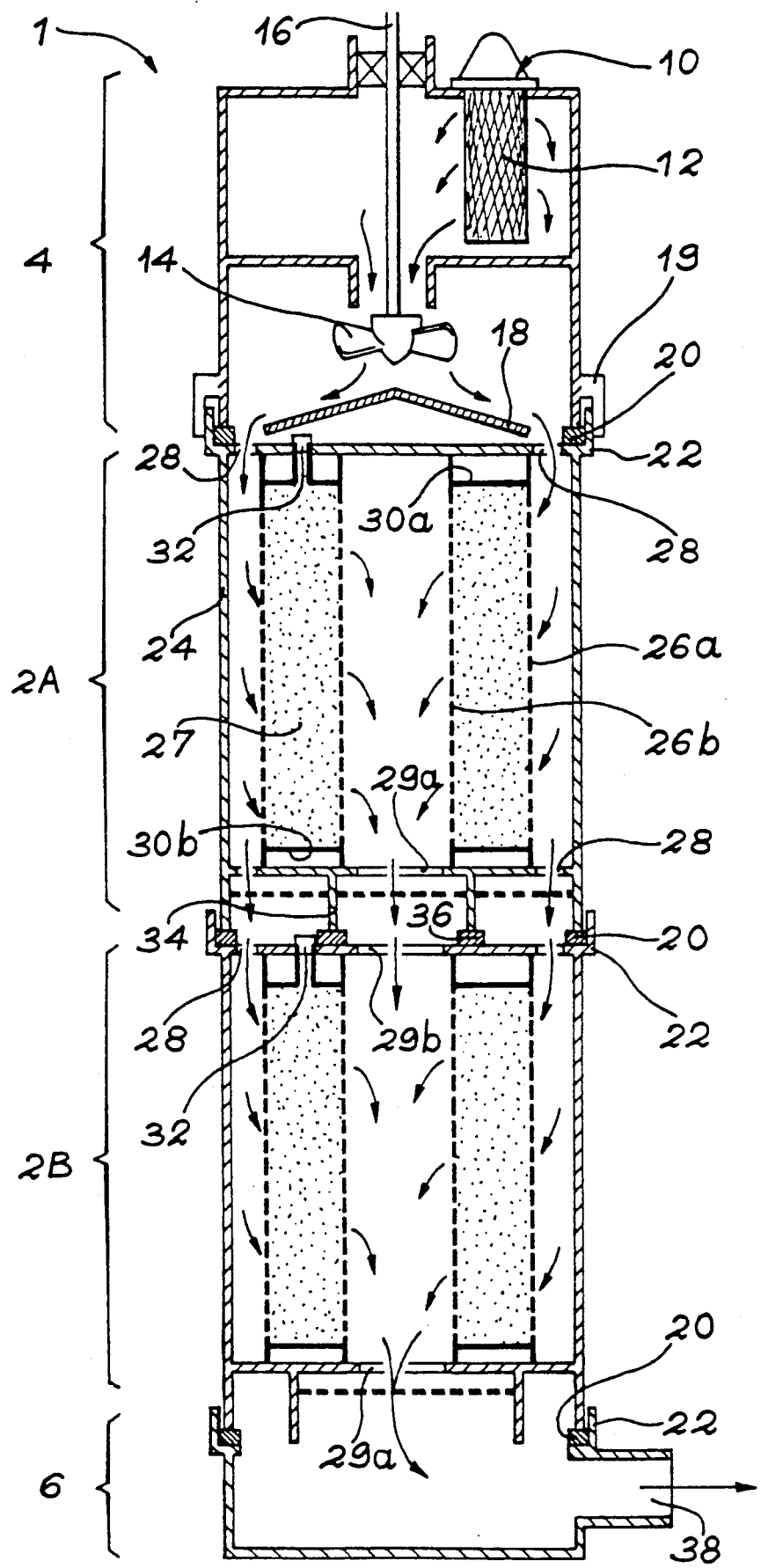

United States Patent [19]
Duquesne

[11] Patent Number: 5,267,280
[45] Date of Patent: Nov. 30, 1993

[54] PROCESS FOR THE CONDITIONING OR RECYCLING OF USED ION CARTRIDGES

[75] Inventor: Jacques Duquesne, Cherbourg, France

[73] Assignee: Cogema-Compagnie Genrales Des Matieres Nucleaires, France

[21] Appl. No.: 951,859

[22] Filed: Sep. 28, 1992

[30] Foreign Application Priority Data

Oct. 10, 1991 [FR] France ............... 91 12476

[51] Int. Cl.⁵ .................. G21F 9/00; G21C 19/00
[52] U.S. Cl. ................... 376/260; 376/313; 252/628; 252/633; 210/682
[58] Field of Search ............ 376/260, 272, 313; 252/626, 633, 628; 210/251, 270, 276, 282, 670, 675, 681, 682; 55/DIG. 9; 414/146

[56] References Cited

U.S. PATENT DOCUMENTS

| | | | |
|---|---|---|---|
| 3,881,899 | 5/1975 | Spulgis | 376/313 |
| 4,715,992 | 12/1987 | Snyder et al. | 252/628 |
| 4,762,647 | 8/1988 | Smeltzer et al. | 252/628 |
| 4,818,472 | 4/1989 | Operschall et al. | 376/260 |
| 4,847,042 | 7/1989 | Musiol et al. | 376/313 |
| 5,198,398 | 3/1993 | van Duijn | 210/675 |

FOREIGN PATENT DOCUMENTS

| | | |
|---|---|---|
| 0036999 | 10/1981 | European Pat. Off. . |
| 0102048 | 3/1984 | European Pat. Off. . |
| 0248286 | 12/1987 | European Pat. Off. . |
| 60-205294 | 10/1985 | Japan . |

*Primary Examiner*—Daniel D. Wasil
*Attorney, Agent, or Firm*—Pearne, Gordon, McCoy & Granger

[57] ABSTRACT

Process for the conditioning or recycling of used ion cartridges.

The invention relates to a process for the treatment of ion cartridges or elements ensuring the treatment of contaminated waters of storage ponds or pools for nuclear reactor fuels. By cartridge transfer and suction means, said treatment consists of extracting the ion exchange resins contained in the cartridge.

When the resin has been extracted, a conditioning process makes it possible to decontaminate and then condition, independently of the resinous substance, the metal structure constituting the cartridge.

When the resin has been extracted, a recycling process makes it possible to clean the impurities from the metal structure and fill it again with new resin.

The invention has applications in the nuclear field and in particular in the field of treatment and conditioning of nuclear waste.

13 Claims, 2 Drawing Sheets

PROCESS FOR THE CONDITIONING OR RECYCLING OF USED ION CARTRIDGES

DESCRIPTION

The present invention relates to a process for conditioning or recycling ion cartridges permitting the treatment of contaminated waters of storage pools or ponds for irradiated fuels from nuclear reactors.

This invention more particularly applies to the nuclear field. Thus, nuclear reactor fuels are stored in pools, whose water must be kept chemically pure. This purity maintenance function is fulfilled by ion exchangers, which are also referred to as ion Nympheas. These Nympheas have two superimposed cylindrical cartridges, each cartridge having an ion exchange resin-filled metal structure. When these Nymphea cartridges (which will be called cartridges for short in the remainder of the description) have become used or spent, they are provisionally stored in a storage pool whilst awaiting their definitive conditioning.

One possible conditioning of said cartridges performed in a specific room consists of injecting thermosetting resin in liquid form into the cartridge, the calender of the latter forming the final envelope for the waste. For economic reasons and the very high operating and investment costs, said process is difficult to put into effect.

The present invention makes it possible to obviate this cost problem by proposing two processes respectively the conditioning and recycling processes in which the resins are extracted from the cartridge in order to permit the conditioning or recycling of the empty cartridge separately from the conditioning of the resins. Thus, once the resins have been extracted, the internal metal structure of the cartridge is rinsed and then, in the case of conditioning, the decontaminated empty cartridge is introduced into a metal container, which will be concreted prior to storage or, in the case of recycling, the decontaminated empty cartridge is filled with new ion exchange resins.

More specifically, the present invention relates to a process for the treatment of used ion cartridges constituted by a hollow metal structure, sealed at its lower end by at least one filter screen and filled with ion exchange resins, said cartridges being stored in a cartridge storage pool. This process, in which use is made of a plurality of pools and a specific transfer casket or flask equipped with a cover and making it possible to transport a cartridge from a discharge pool to a treatment cell, is characterized in that it consists of performing the following operations:

a) the transfer of the cartridge from the storage pool to a discharge pool, b) placing the cartridge to be conditioned in the transfer casket, c) emersion and decontamination of the transfer casket in a decontamination cell, d) transfer from the casket to the treatment cell and e) extraction by suction means of the resin contained in the cartridge.

Advantageously, the operation a) consists of loading the cartridge to be conditioned into a transfer basket in an immersed medium for transferring it from the storage pool to the discharge pool. The latter is designed to receive several casket types containing fuel elements and permit their discharge.

Operation d) of transferring the casket to the treatment cell comprises an engagement or berthing operation. More specifically, the latter consists of tightly positioning the casket respectively beneath the treatment cell, removing the cover from the casket and transferring said cover into said cell in order to ensure an opening between the casket and the cell.

According to an embodiment of the invention, the suction means used for the extraction of the resins have a suction pipe introduced on the one hand into the cartridge and connected on the other to a pneumatic pump, which is itself connected to a spent resin storage unit.

For the conditioning of the cartridges, the process also consists of carrying out, following the extraction of the resins, the following operations:

f) removal of the cartridge from the casket and decontamination of the internal structure in the treatment cell, g) deposition of the contaminated cartridge in a conditioning case ensuring the confinement of said cartridge and h) deposition of the case in a storage container.

The operation of depositing the cartridge in the case comprises an operation of engaging or berthing the case beneath the treatment cell and which consists of tightly positioning the case respectively beneath the treatment cell (the transfer casket having been previously disengaged), removing the cover from the case and transferring said cover into said cell in order to ensure an opening between the case and the cell.

Advantageously, the process has a final operation i) consisting of filling the container with concrete for the storage thereof.

According to an embodiment of the invention, following operation f), the process comprises the possibility of carrying out an operation of cutting up the cartridge in order to reduce its volume during the conditioning of said structure in the storage container.

For the recycling of cartridges, the process also consists of carrying out, following the extraction of the resins, the following operations:

j) removing the empty cartridge from the casket and transferring said cartridge into the treatment cell, k) disassembling the filter screen and washing the latter, l) decontamination and cleaning of the internal metal structure of the cartridge without its screen, m) reassembling the filter screen on the cartridge and putting into place again the said cartridge in the transfer casket and n) filling the metal structure of the cartridge with new ion exchange resins.

More specifically, the washing of the filter screen consists of transferring the screen into an ultrasonic tank, where it is cleaned.

According to the invention, the process involves a final operation o) of transferring the casket into the discharge pool permitting the transfer of the recycled cartridge to a storage pool.

The invention is described in greater detail hereinafter relative to a non-limitative embodiment and the attached drawings, wherein show:

FIG. 1 A diagrammatic representation of an ion Nymphea.

Figure 2:
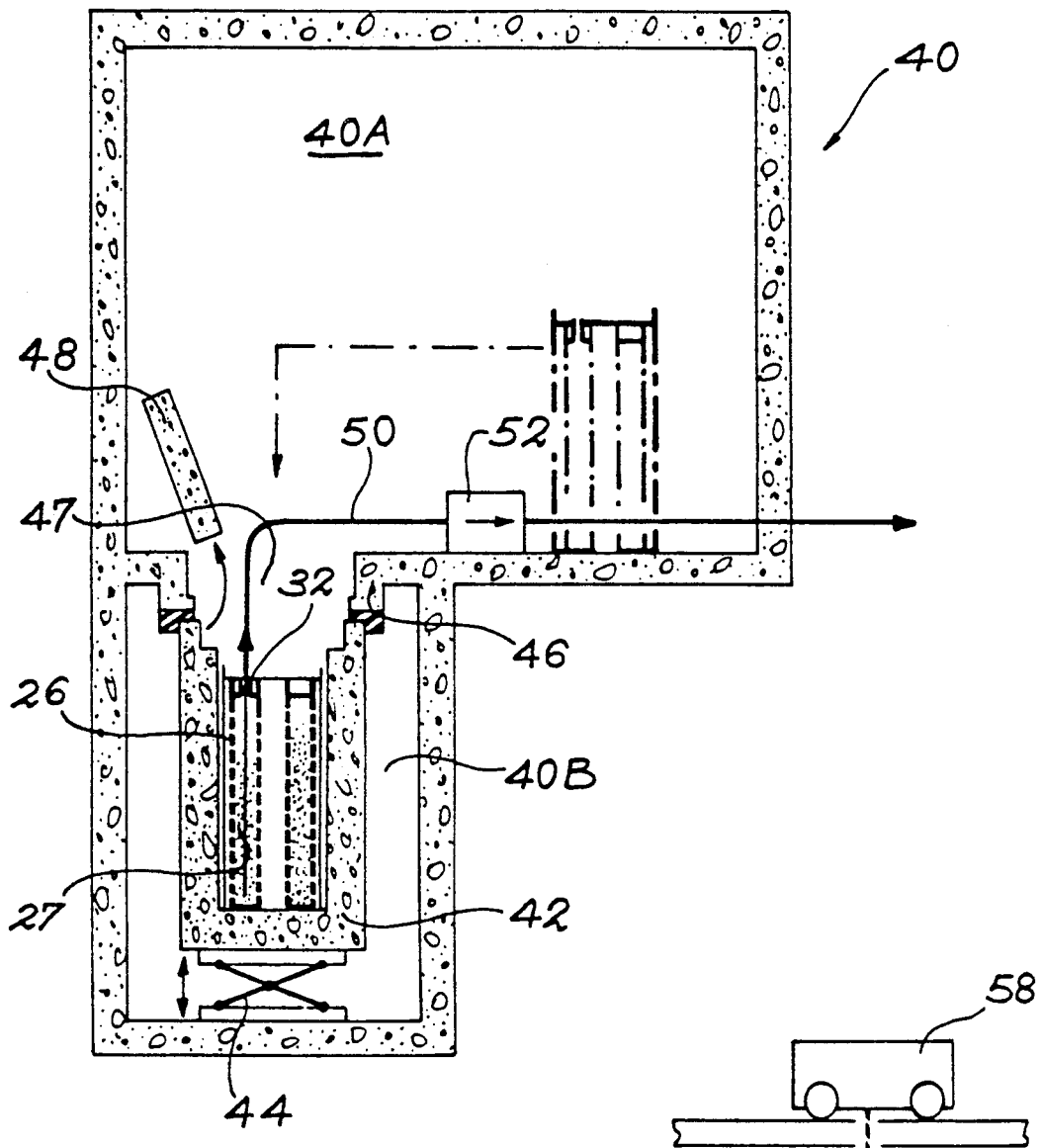

FIG. 2 A diagrammatic representation of the engagement/disengagement operations of the transfer casket beneath the treatment cell.

Figure 3:
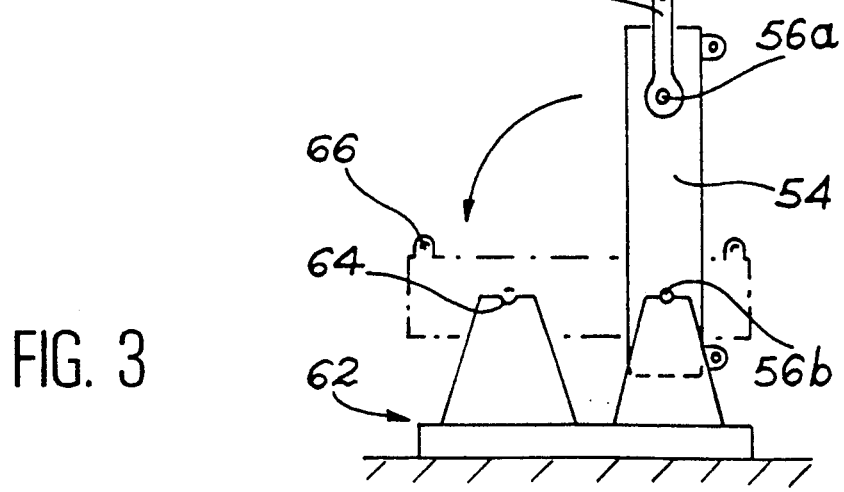

FIG. 3 A very diagrammatic representation of the placing of the case containing the decontaminated empty cartridge in the container.

In the following description details will be given of the different operations performed from the storage of the cartridges in the storage pool up to the concreting of the container containing the case and consequently the decontaminated empty cartridge and also the different operations performed from the storage of the used cartridges in the storage pool up to the return of the recycled cartridges to the same storage pool.

In order to facilitate understanding of the processes according to the invention, FIG. 1 shows an ion Nymphea with its two Nymphea cartridges, which are referred to simply as cartridges. Thus, each Nymphea 1 has two cylindrical, superimposed cartridges 2A, 2B. It also has a suction system 4 positioned above the top cartridge 2A and an outflow unit 6 positioned below the bottom cartridge 2B.

The suction system 4 comprises an opening 10 by which the contaminated water is introduced into the Nymphea, a filter system 12 and a propeller 14 connected by a shaft 16 to a motor external of the Nymphea and not shown in the drawing. The suction system 4 also comprises a deflector 18 located below the propeller 14.

The suction system 4 is fitted onto the top cartridge by means 19 aligning the cartridge 2A with the suction system 4. Gripping lugs 22 for the cartridges 2A, 2B also ensure the respective alignment of the cartridge 2A with the suction system 4 and the cartridge 2B with the cartridge 2A. These gripping lugs 22 also have the essential function of enabling an operator to seize and displace each of the cartridges with the aid of a handling device and this will be described in greater detail hereinafter. Joints 20 ensuring the sealing of the complete Nymphea with respect to the outside are respectively associated with each of the gripping lugs 22.

The top and bottom cartridges 2A, 2B respectively are similar to one another and have a calender 24 and a perforated sheet metal structure 26a, 26b. This metal structure has two perforated sheets covered with metal gauzes 26A, 26B, which are circular and of different sizes forming two perforated ferrules within one another. The volume between two said two ferrules 26a, 26b and forming a confinement chamber is filled with a resin adequate for ion exchange purposes and which is known to the Expert. Bottom and top covers designated respectively 30b, 30a maintain the resin within the confinement chamber formed by the two ferrules 26a, 26b. Circular openings 28 ensure the passage of the contaminated water between the suction system or unit 4 and the cartridge 2A and between the two cartridges 2A and 2B.

Each cartridge also comprises a detachable plug 32 placed in an opening of the top cover 30a. In its closed position, said plug ensures the confinement of the resin within the confinement chamber and in its open position permits the introduction of a suction rod, not shown in the drawing, but described hereinafter.

Filter screens 29a positioned in the bottoms of the calendars of the cartridges and openings 29b in the surface of the calender of the bottom cartridge 2B ensure the passage of the decontaminated water through the Nymphea.

A wall 34 associated with a joint 36 ensures a separation between the contaminated water and the decontaminated water in the intermediate part between the calenders 24 of the cartridges 2A and 2B.

The outflow unit 6 is fitted beneath the bottom cartridge 2B by means identical to those ensuring the fitting of the bottom cartridge 2B to the top cartridge 2A. This outflow unit 6 collects the decontaminated waters from the cartridges 2A and 2B and which enter said unit 6 by the filter screen 29a. Ducts 28 ensure the discharge of decontaminated water to the fuel storage pool in which is placed the Nymphea. Thus, the ion Nymphea is placed in the fuel storage pool. All the Nymphea visible in FIG. 1 is immersed. Only the motor supplying the suction unit 4 with power is emerged.

The contaminated water is introduced into the Nymphea through the opening 10 by means of the shaft 16/propeller 14 assembly permitting the suction of water into the Nymphea. The filters 12 positioned at the Nymphea intake make it possible to hold back particles of a certain size, e.g. exceeding 100 micrometers. The contaminated water to be treated is then oriented by the deflector 18 on the periphery of the top cartridge 2A and traverses a first series of openings 28, there being twenty, four of the latter in the Nymphea shown. Part of the contaminated water is evacuated on the periphery of the bottom cartridge 2B, whilst the other part traverses the resin bed 27 of the top cartridge 2A.

The treated and therefore decontaminated waters are evacuated by the screens and central openings 29a, 29b to the outflow unit 6. Part of the waters evacuated to the bottom cartridge 2B traverses the resin bed 27 thereof in order to be evacuated, when treated, to the outflow unit 6.

The thus decontaminated waters can be evacuated from said unit 6 in several directions, when there are several ducts 38, in the present case there are three ducts (only one of which is visible) for the Nymphea described.

The processes according to the invention also consist of conditioning or recycling cartridges 2A, 2B. No matter whether conditioning or recycling is involved, when said cartridges 2A, 2B are used or spent, they are removed from the Nymphea by the operator and brought into a spent cartridge storage pool.

In the following description, the first part will relate to the treatment of the cartridges common to the recycling and conditioning processes thereof. A description will then be given of the specific stages of the conditioning process and the specific stages of the recycling process. Thus, a description will be given hereinafter of the stages necessary for the treatment of the cartridges from the spent cartridge storage pool to the removal of the spent resins from the cartridge metal structure.

Each cartridge is firstly transferred from the storage pool to the discharge pool by a transfer basket, which permits the underwater transportation of a cartridge from one pool to another. A transfer casket is located in said discharge pool. The cartridge is then transferred from the transfer basket into the transfer casket.

This transfer casket, called casket for short, is used for transporting the cartridge from the discharge pool to the treatment cell, said pool and said cell having no common opening which would enable the cartridge to pass from one to the other leaving it constantly immersed, because the treatment cell is not under water. Therefore the cartridge must be transported over the water level and the casket enabling this to take place has a first cartridge confinement function. It is also equipped with a thickness of lead and is filled with water, which ensures the biological protection of the operators after emersion.

The transfer of the cartridge into the casket takes place by means of a travelling crane under which is attached a pole. This pole is fitted by means of a gripping system into the transfer basket and ensures the displacement thereof under water from the storage pool to the discharge pool. The cartridge is then transferred into the casket waiting in the discharge pool. A cover is placed tightly on the casket, equipped with a crossbar, to which is fixed one end of a pole. The second end of the pole is emerged and can be seized and attached to a travelling crane. Under the action of the latter, the casket is raised and removed from the slightly contaminated water of the discharge pool.

The casket containing the cartridge is then transferred into a decontamination cell, where its outer wall is decontaminated so that it can be transferred below the treatment cell, said operation requiring its passage into areas which must not be contaminated.

After decontamination, the casket can be transferred and then engaged beneath the treatment cell, from which are extracted from the cartridge the resins. When the decontamination cell is removed, the casket is deposited on a motorized trolley and transferred into a cell located beneath the treatment cell. A casket engagement operation is then performed below the treatment cell and is shown in FIG. 2.

More specifically, the treatment cell comprises a surface cell 40A and a subcell 40B. For the engagement operation, the casket 42 is introduced into the subcell 40B and positioned on a height-variable stool 44. This stool permits the engagement of several casket types by adjusting the position of the casket 42 relative to the opening 47 located in the floor of the surface cell 40A. This opening 47 is closed (when there is no engagement) by a not shown cell cover.

When the casket 42 is correctly positioned, a ring 46 equipped with a packing or seal ensures the sealing between the upper portion of the casket 42 and the floor of the surface cell 40A. The cell cover and then the casket cover 48 are removed and transferred into said cell 40A. There is then a communication between the casket 42 and the surface cell 40A.

The cartridge plug 32 is then removed to permit the passage of a suction rod 50 connected by a flexible tube to a suction pump 52. This compressed air-pump 52 ensures the suction through the rod 50 of the resin contained in the cartridge. The thus extracted resin is discharged to a resin storage unit, positioned outside the cell 40 and not shown in the drawing.

When the resin has been extracted from the cartridge, the empty cartridge can either be conditioned or recycled. In the following description part, details will be given of the stages permitting the conditioning of the empty cartridge.

Thus, when the resin has been removed from the cartridge, the latter is moved out of the casket by means of a crossbar fixed beneath a travelling crane and decontaminated under high pressure water in a well of the treatment cell 40 in order to eliminate all the active resins. The empty cartridge is shown in mixed line form in FIG. 2 outside the said casket, the rinsing well not being shown for reasons of clarity.

According to an embodiment of the invention, video means are located in the cell 40 to permit a visual examination of the purity state of the internal cartridge structure 26.

The disengagement of the casket can then take place and it can be returned to the discharge pool, where another cartridge will be introduced into the said casket.

The disengagement operation is the reverse of the engagement operation, namely replacement of the cover 48 on the casket 42, replacement of the cell cover on the opening 47 and withdrawal of the casket 42 from below the floor of the surface cell 40A. The casket 42 is then transferred again by the motorized trolley to the discharge pool, where another cartridge is placed in the casket.

As the subcell 40B is free, it is then possible to engage the conditioning case brought by the motorized trolley. This case engagement operation is similar to that described for the casket with the positioning of the case beneath the surface cell 40A, its sealing and the removal of the covers. The function of the conditioning case is to confine the decontaminated empty cartridge when it leaves the intervention cell 40. When the case has been engaged, the resin-free cartridge is introduced into the case. It is then possible to disengage said case, which is transferred into a metal container.

FIG. 3 shows the operation of transferring the case into the container.

Thus, after disengagement, the case 54 is in the vertical position. Journals 56a, 56b respectively in the top and bottom parts of the case 54 permit its gripping and tilting into a horizontal position. More specifically, the case 54 is raised with the aid of a travelling crane beneath which is hung a crossbar 60, which is placed on the upper journal 56a. The thus raised case 54 is positioned in such a way that its bottom journals 56a are fitted into the notches 64 of a cradle 62, which permits the rotation of the case 54 and its bringing into a horizontal position.

When the case 54 is in the horizontal position, not shown handling slings make it possible to attach case lifting rings 66 in order to transport it into the container. The container can then be concreted, i.e. the volume between the outer face of the case and the inner face of the container can be filled with concrete. Thus concreted, the container can be stored without any contamination risk for the external medium.

According to another embodiment of the invention, the resin-free cartridge can be introduced into a decanning room in order to be cut up. In this way its volume is considerably decreased, which permits the use of cases and therefore containers of reduced size and therefore the volume of the waste to be stored is reduced.

The cartridge recycling process comprises all the already described operations up to the resin extraction operation. When the metal structure has been freed from all resin, this recycling process consists of cleaning the said structure and filling it with new resin.

The cleaning of the metal structure consists of cleaning on the one hand the wire gauzes and on the other the filter screens.

According to an embodiment of the invention, the filter screens are produced in disassemblable manner so as to facilitate their cleaning during the recycling of cartridges. In addition, the empty cartridge is extracted from the transfer casket engaged beneath the treatment cell by means of the crossbar and the travelling crane. It is then transferred to a glovebox of said cell. The term glovebox is used to describe a cell from which operators can carry out manual operations without there being any risk of breaking the confinement existing in the casket and the treatment cell.

The lower part of the empty cartridge is placed in said glovebox, where an operator manually dismantles the filter screen or screens from said cartridge. The filter screens are then immersed in an ultrasonic tank, where they are unclogged, i.e. all impurities are removed.

In parallel to this filter screen unclogging, the empty cartridge is transferred into a treatment cell rinsing well, where it is cleaned with high pressure water.

Clean filter screens are then refitted to the cleaned cartridge, which has been retransferred into the glovebox in order to permit the refitting of said screens. The reconstituted empty cartridge (i.e. clean and refitted) is replaced by means of the crossbar and travelling crane for the treatment cell, in the casket engaged beneath said cell.

The operation of filling the metal structure with new resin can then be carried out from a preparation cell or vessel placed outside the intervention cell and containing new ion exchange resins. When the structure is full, new plugs are remotely placed on the top cover of the cartridge.

According to any embodiment of the invention, the new resins contained in the preparation cell are mixed with water from which the silica has been removed, in order to permit an easier flow of said resin into the piping used for the filling of the cartridge. During the filling of said cartridge, the silica-free water is pumped into the casket in order to maintain a constant water level in said casket.

Thus, when the cartridge is ready for reuse, the casket is disengaged and transferred to the discharge pool, where the cartridge is extracted from the casket and transferred into the cartridge storage pool by the transfer basket. The recycled cartridge is stored awaiting reuse.

In addition, according to this recycling process, only the spent resins have to be stored, which leads to a considerable waste storage volume gain, as well as to significant economies, because the empty cartridges are reused.

I claim:

1. Process for the treatment of used ion cartridges stored in a cartridge storage pool and constituted by a hollow internal metal structure, having at its lower end at least one filter screen and filled with ion exchange resins, use being made of a plurality of pools and at least one transfer casket equipped with a cover and making it possible to transport a cartridge from a pool to a cell, characterized in that it comprises performing the following operations:
   a) transfer of the cartridge from the storage pool to a discharge pool,
   b) placing the cartridge to be conditioned within the transfer casket,
   c) decontamination of the transfer casket in a decontamination cell,
   d) transfer of the casket to a treatment cell and
   e) extraction by suction means of the ion exchange resins contained in the cartridge.

2. Process according to claim 1, characterized in that the operation a) consists of loading the cartridge to be conditioned into a transfer basket in an immersed medium for the transfer thereof from the storage pool to the discharge pool.

3. Process according to claim 1, characterized in that the transfer of the casket to the treatment cell comprises an operation of engaging the casket beneath said treatment cell.

4. Process according to claim 3, characterized in that the engagement operation consists of tightly positioning the casket beneath the treatment cell, removing the cover from the casket and transferring said cover into said cell in order to ensure an opening between the casket and the cell.

5. Process according to claim 1, characterized in that the suction means used for the extraction of the ion exchange resins have a suction pipe introduced on the one hand into the cartridge and connected on the other to a pneumatic pump, which is itself connected to a resin storage unit.

6. Process according to claim 1, characterized in that it also comprises carrying out, following the extraction of the ion exchange resins, the following operations for the conditioning of the empty cartridges:
   f) removal of the empty cartridge from the casket and decontamination of the internal metal structure of the cartridge,
   g) deposition of the decontaminated empty cartridge in a conditioning case ensuring the confinement of said cartridge and
   h) deposition of the case in a storage container.

7. Process according to claim 6, characterized in that the deposition of the cartridge in the case comprises an operation of engaging the case beneath the treatment cell.

8. Process according to claim 7, characterized in that the engagement operation consists of tightly positioning the case beneath the treatment cell, removing the cover from the case and transferring said cover into said cell in order to ensure an opening between said case and said cell.

9. Process according to claim 6, characterized in that it involves a final operation i) consisting of filling the container with concrete for the storage thereof.

10. Process according to claim 6, characterized in that it comprises, following the operation f), an operation of cutting up the metal structure in order to reduce its volume during the conditioning of said structure in the storage container.

11. Process according to claim 1, characterized in that it also comprises carrying out, following the extraction of the ion exchange resins, of the following operations for recycling the empty cartridges:
   j) removal of the empty cartridge from the casket and transfer of said cartridge into the treatment cell,
   k) disassembly of the filter screen and washing the latter,
   l) decontamination and cleaning of the internal metal structure of the cartridge without its screen,
   m) refitting the filter screen to the empty cartridge and putting back said cartridge in place in the transfer casket and
   n) filling the internal metal structure of the cartridge with new ion exchange resins.

12. Process according to claim 11, characterized in that the washing of the filter screen consists of transferring said screen into an ultrasonic tank, where it is cleaned.

13. Process according to claim 11, characterized in that it involves a final operation o) of transferring the casket into a discharge pool, where the cartridge is extracted from said casket and transferred into the cartridge storage pool by a special vehicle.

* * * * *